United States Patent
Homann

(10) Patent No.: US 11,433,593 B2
(45) Date of Patent: Sep. 6, 2022

(54) SYSTEM OF CORRUGATED PLATES

(71) Applicant: HOMANN HOLZWERKSTOFFE GMBH, Munich (DE)

(72) Inventor: Fritz Homann, Munich (DE)

(73) Assignee: Homann Holzwerkstoffe GmbH, Munich (DE)

( * ) Notice: Subject to any disclaimer, the term of this patent is extended or adjusted under 35 U.S.C. 154(b) by 224 days.

(21) Appl. No.: 16/646,659

(22) PCT Filed: Aug. 15, 2018

(86) PCT No.: PCT/EP2018/072147
§ 371 (c)(1),
(2) Date: Mar. 12, 2020

(87) PCT Pub. No.: WO2019/057406
PCT Pub. Date: Mar. 28, 2019

(65) Prior Publication Data
US 2020/0276749 A1  Sep. 3, 2020

(30) Foreign Application Priority Data

Sep. 19, 2017 (EP) .................................... 17191821

(51) Int. Cl.
| | |
|---|---|
| *B29C 53/26* | (2006.01) |
| *B27N 3/18* | (2006.01) |
| *B27N 5/00* | (2006.01) |
| *B29C 53/28* | (2006.01) |
| *B29K 311/14* | (2006.01) |

(52) U.S. Cl.
CPC .............. *B29C 53/265* (2013.01); *B27N 3/18* (2013.01); *B27N 5/00* (2013.01); *B29C 53/285* (2013.01); *B29K 2311/14* (2013.01)

(58) Field of Classification Search
CPC ..... B29C 53/265; B29C 53/285; B17N 3/083; B17N 3/08
See application file for complete search history.

(56) References Cited

U.S. PATENT DOCUMENTS

| | | | | |
|---|---|---|---|---|
| 4,212,616 A | * | 7/1980 | Tilby | ..................... B27N 3/143 425/256 |
| 4,605,467 A | * | 8/1986 | Bottger | ..................... B27N 3/24 156/499 |

(Continued)

FOREIGN PATENT DOCUMENTS

| | | |
|---|---|---|
| DE | 4406161 A1 | 8/1995 |
| EP | 1512507 A2 * | 3/2005 ............... B27N 5/00 |

(Continued)

*Primary Examiner* — Kelly M Gambetta
*Assistant Examiner* — Virak Nguon
(74) *Attorney, Agent, or Firm* — Harness, Dickey & Pierce, P.L.C.

(57) ABSTRACT

The disclosure relates to a method for producing a three-dimensionally shaped plate consisting of a wood fibre material. The aim of the disclosure is to provide a method and a system for producing three-dimensionally shaped plates from a wood fibre material, which are logistically simplified and can be used on demand. To this end, e) steam is applied to a prefabricated flat starting plate consisting of a wood fibre material, and f) the plate is coated with a separating means, g) shaped in a forming station, and h) hardened by cooling.

14 Claims, 1 Drawing Sheet

(56) References Cited

U.S. PATENT DOCUMENTS

| | | | | |
|---|---|---|---|---|
| 5,989,468 A * | 11/1999 | Lundgren | ............... | B27N 3/08 |
| | | | | 264/83 |
| 2012/0070626 A1 * | 3/2012 | Battis | ...................... | B27N 3/00 |
| | | | | 428/192 |
| 2017/0225355 A1 * | 8/2017 | Kumar | ................. | C08G 18/168 |

FOREIGN PATENT DOCUMENTS

| | | | | |
|---|---|---|---|---|
| EP | 1512507 A2 | 3/2005 | | |
| EP | 2660408 B1 * | 7/2017 | ........... | E04C 2/3405 |
| JP | H10278014 A | 10/1998 | | |

\* cited by examiner

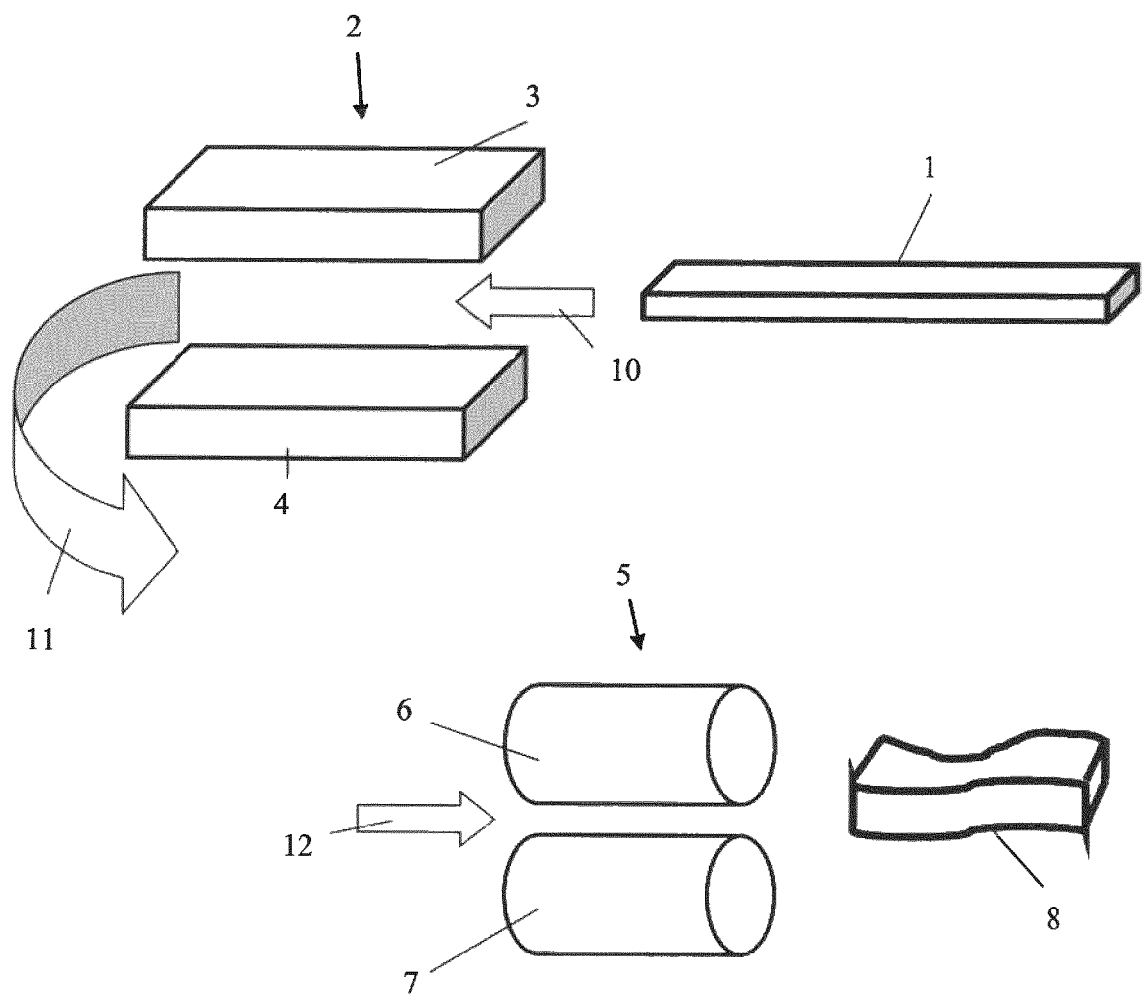

SYSTEM OF CORRUGATED PLATES

CROSS-REFERENCE TO RELATED APPLICATIONS

This application is a National Phase of International Application No. PCT/EP2018/072147 filed on Aug. 15, 2018, which claims the benefit of European Patent Application No. 17191821.2, filed on Sep. 19, 2017. The entire disclosures of the above applications are incorporated herein by reference.

FIELD

The present disclosure relates to a method for producing a three-dimensionally shaped plate consisting of a wood fiber material. The disclosure also relates to a system for producing three-dimensionally shaped plates from wood fiber material.

BACKGROUND

This section provides background information related to the present disclosure which is not necessarily prior art.

Occupy a large volume at a low thickness due to the corrugation.

By designing the fiber plate, a plate is produced that fills a large volume in relation to its bulk density. Room volume within the meaning of the disclosure is the substantially cuboidal space filled by the plate. While bulk density or plate volume itself refers to the solid-material area of the plate, the room volume is formed by flat surfaces on the uppermost and lowermost projections of the shaped plate being supplemented by circumferential side edges to form a cuboid completely enclosing the plate. This cuboid has a volume which is clearly larger than the volume defined by the solid-material area of the plate itself. According to an advantageous proposal of the disclosure, the plate thickness is exceeded by the volume height at least by a factor of 3.

A particular advantage of the plate is that it combines increased mechanical properties with a low density. Due to the shaping, the plate becomes mechanically more stable in itself. It is generally known that curved or bent elements are particularly stable if subjected to pressure load along the bending axis. But in the present case, the plate is extremely stable and resistant to breakage also due to its bulk density in the shaping direction.

The plate has the advantage that the fields of application of the plates are considerably extended. Due to its low weight compared to the density, such a plate can be used as filler such as in the manufacture of doors and wall elements, for example. Due to its mechanical strength, the surface can be drilled and can hold screws and nails.

It can be directly provided with so-called edge bands, i.e. strips that are glued or otherwise attached to the side edges. Due to the three-dimensional shaping, the plate offers a considerable attachment surface at the side edges.

The plates can also be used in sandwich structures. They can be connected to similar three-dimensionally shaped plates by laying the plates on top of each other and fixing them in either way. Here it is an advantage if the three-dimensional shapings are arranged at right angles to each other. If, for example, two identical plates having a corrugated contour are connected to each other, the plates can be superposed at right angles to each other. This results in a large number of contact points and a considerable density at a very low plate weight. The mechanical strength is immense.

A disadvantage of the above-described technology is the production process. According to prior art, correspondingly shaped plates are produced from the scattered mats. They must therefore be subsequently transported and installed on site. This imposes a burden on logistics, because in addition to the conventional flat plates, corrugated plates must now also be provided in appropriate formats for the various purposes.

But such plates are particularly suitable for buildings of different types, residential beams, protective casings in the field of plank construction, electrical systems and the like and are an inexpensive but very well usable material especially in remote and also poorer areas.

However, this is opposed to the aforementioned logistical problems, as it would be desirable to be able to decide on site whether to build the flat plate or a corrugated plate, or whether to use specific products such as corrugated roof shingles and the like.

SUMMARY

This section provides a general summary of the disclosure, and is not a comprehensive disclosure of its full scope or all of its features.

Based on the above-described prior art, it is an object of the present disclosure to provide a method and a system for producing three-dimensionally shaped plates from a wood fiber material, which method and process are logistically simplified and can be used on demand.

According to the disclosure, a prefabricated flat plat is used as a starting plate. Such a plate is a wood fiber material plate, and the disclosure proposes MDF plates. Such an MDF plate as a starting plate is used with a basis weight of 1.0 to 3.0 kg/m$^2$ and a thickness of 1.0 to 3 mm.

Such plates are part of the system which additionally comprises a processing installation. The processing installation at least comprises a vaporization unit and a forming station.

First of all, steam is applied to a starting plate. According to the disclosure, steam can be applied at a temperature of 100 to 150° C. and at a steam pressure of 0.1 bar to 8 bar. A steam quantity of 60 to 500 kg/h may be produced.

After the vaporization and, if necessary, also prior to or during the vaporization, the plate is coated with a separating means. According to one proposal of the disclosure, nozzles are used for this purpose. The separating means is used in quantities of 10 to 100 g/m$^2$ and is primarily intended to prevent that the plate to which steam has been applied and which is to be subjected to shaping will stick to the molding units in the forming station.

According to the disclosure, shaping is performed between at least one pair or rollers. Corrugating rollers and calendars can be used, so that a plate having a corrugated shape is produced. This corrugated shape can have a corrugation height of 6.5 to 50 mm, and usually the plate is compacted at least by 30%. This means that a starting plate of 1.5 to 3 mm results in a final material thickness of 0.5 to 2 mm.

Shaping can be performed at temperatures around 250° C. and at a pressure in the range of 200 N/mm$^2$. If necessary, the temperature can be additionally increased, for example, by additional steam, microwave technology or infrared radiators or similar heat sources. The plate can also be passed through several pairs of calendars with corrugating rolls, but at least through one pair.

Subsequent cooling preferably takes place at ambient temperature and can be in the range of a few minutes, e.g. 2 to 5 mm, depending on the thickness of the material and the height of the corrugation.

The system according to the disclosure comprises prefabricated flat starting plates on the one hand, and the processing installation on the other. The vaporization unit can comprise several steam output units so that the flat starting plate is passed through these steam output units. Then the plate is fed to a roller pair or a group of roller pairs.

The processing installation can be designed as a mobile unit.

The disclosure makes it possible to produce three-dimensionally shaped plates almost anywhere on site. Parts of the processing installation, e.g. spraying or coating with the separating means, can be performed manually. Vaporization must take place in a controlled manner and over the full surface, so that a vaporization unit is recommended here. Shaping between two rollers is also compulsory according to the system of the disclosure.

All other measures such as additional vaporization, infrared curing, UV light and the like can also be used separately.

The system according to the disclosure can be designed as a mobile unit. In this way, the units can be processed together with the starting plates on the spot.

The appropriately shaped plates have a number of advantages, such as greater stability and rigidity, and can be used for other construction purposes than the pure flat plate. In this way, roofs or even shingles and the like can be produced.

Accordingly, other coatings can be applied to the plate surfaces at the appropriate stage of the process, e.g. to make them waterproof, to pre-harden them and the like, if this is chemically and technically feasible. These coatings can be performed together with the separating means, if this is chemically and technically feasible.

The disclosure proposes a universally applicable system and a universally applicable process for the simple production of three-dimensionally shaped, preferably corrugated, plates of wood fiber materials.

The method and the system according to the disclosure greatly simplify logistics. Consumers continue to purchase flat plates. They can tailor these as they wish, i.e. sawing shingle material, making wall fillings and the like and so on. Thereafter, they can produce the desired corrugated structure using the processing installation which is part of the system, so that suitable stable plates are then available.

Further areas of applicability will become apparent from the description provided herein. The description and specific examples in this summary are intended for purposes of illustration only and are not intended to limit the scope of the present disclosure.

DRAWINGS

The drawing described herein are for illustrative purposes only of selected embodiments and not all possible implementations, and are not intended to limit the scope of the present disclosure.

Further advantages and features of the disclosure will become apparent from the following description with reference to the drawing FIGURES.

FIG. 1 shows a schematic view of a production process in a schematically illustrated processing installation.

Corresponding reference numerals indicate corresponding parts throughout the several views of the drawing.

DETAILED DESCRIPTION

Example embodiments will now be described more fully with reference to the accompanying drawing.

In FIG. 1, a flat starting plate 1 is passed through between vaporization elements 3 and 4 of a vaporization unit 2 in the direction of arrow 10 while steam is applied to the plate from above and below, the vaporization time being chosen as a function of the steam quantity and the material thickness of the plate.

The vaporized plate is then supplied to a forming station 5 in the direction of arrow 11, which forming station consists of two rollers 6 and 7, e.g. a calendar and a corrugating roller, in the illustrated embodiment. The plate is passed through in the direction of arrow 12 to finally produce the corrugated plate 8.

The direction of arrow 11 has been chosen exclusively for the purpose of illustration. The arrangement of the stations relative to each other is arbitrary. These can be arranged one behind the other for continuous processes or they can be in a different relation to each other depending on the circumstances. The embodiment described only serves the purpose of explanation and is not limiting.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for producing a three-dimensionally shaped plate of a wood fiber material, wherein
    a) applying steam to a prefabricated flat starting plate of a wood fiber material,
    b) coating the plate with a separating means,
    c) shaping the plate in a forming station and
    d) curing the plate by cooling,
   wherein
    an MDF plate having a thickness of 1.0 to 3.0 mm is used as the flat starting plate, wherein shaping is performed between at least one roller pair and includes defining a corrugation in the plate.

2. The method according to claim 1, wherein an MDF plate having a basis weight of 1.0 to 3.0 kg/m$^2$ is used.

3. The method according to claim 1, wherein vaporization is performed at a temperature of 100° C. to 105° C., a steam pressure of 0.1 to 8 bar and a steam quantity of 60 to 500 kg/h.

4. The method according to claim 1, wherein coating takes place using nozzles.

5. The method according to claim 4, wherein the separating means is used in a quantity of 10 to 100 g/m$^2$.

6. The method according to claim 1, wherein the corrugation has a corrugation height of 6.5 to 50 mm.

7. The method according to claim 1, wherein the plate is compacted by at least 30% within the roller pair.

8. The method according to claim 1, wherein shaping is performed at a temperature of 240° C. and a pressure of 200 N/mm$^2$.

9. The method according to claim 1, wherein an additional temperature increase takes place during shaping.

10. The method according to claim 1, wherein cooling is performed at ambient temperature.

11. A system for producing a three-dimensionally shaped plate of a wood fiber material using the method according to claim 1, the system comprising at least
   a) prefabricated flat starting plates of a wood fiber material and
   b) a processing installation comprising
      i. a vaporization unit and
      ii. a forming station,
   wherein the flat starting plates are MDF plates having a thickness of 1.5 to 3.0 mm and that the forming station at least comprises one pair of rollers to define a corrugation in the plate.

12. The system according to claim 11, wherein the MDF plates have a basis weight of 1.0 to 3.0 kg/m$^2$.

13. The system according to claim 11, wherein the vaporization unit comprises several steam output units.

14. The system according to claim 11, wherein the processing installation is designed as a mobile unit.

* * * * *